Jan. 20, 1953
C. H. REYNOLDS
2,625,976
NONSKID TIRE CHAIN ATTACHMENT
Filed May 24, 1949
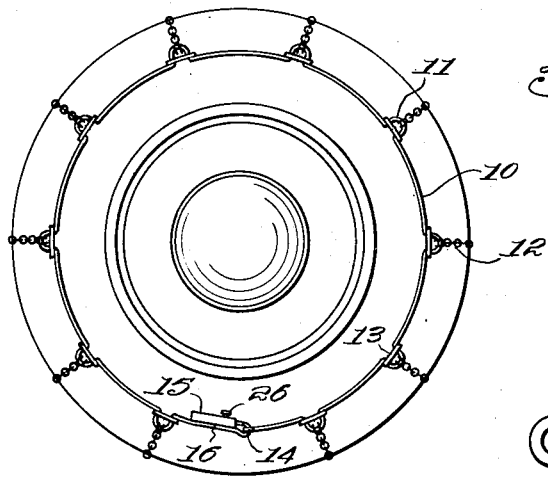
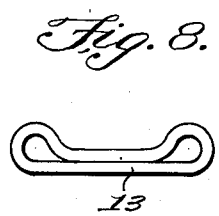
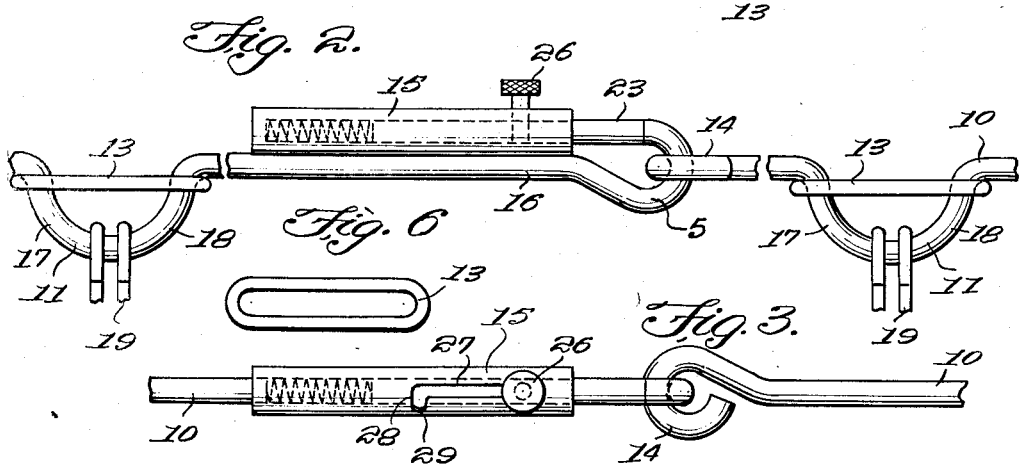
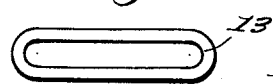
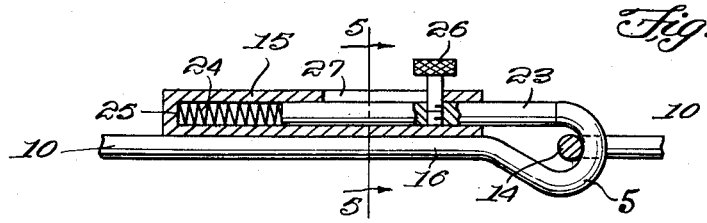
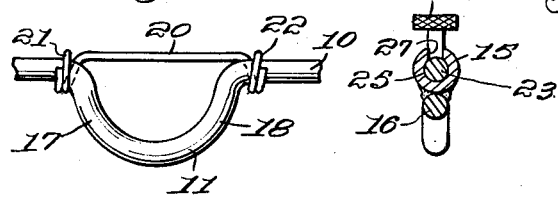
INVENTOR.
Charles H. Reynolds,
BY Victor J. Evans & Co.
ATTORNEYS Patented Jan. 20, 1953

2,625,976

UNITED STATES PATENT OFFICE 2,625,976

NONSKID TIRE CHAIN ATTACHMENT

Charles H. Reynolds, Donora, Pa.

Application May 24, 1949, Serial No. 95,117

1 Claim. (Cl. 152—242)

This invention relates to improved attaching means for non-skid tire chains where the chains are supported by split rings, and in particular means for retaining the chains in position on the rings and means for releasably attaching the ends of the rings.

The purpose of this invention is to facilitate mounting non-skid chains on tires by retaining cross chains in spaced relation on split rings and by providing rugged attaching elements for the rings.

This invention is an improvement over the auto tire chain ring of my prior Patent Number 2,458,642 in that improved connecting elements are provided at the ends of the rings and loops are provided for retaining the cross chains in the off-sets or loops of the rings.

The most troublesome problem in applying non-skid chains to tires is in maintaining the cross chains in proper relation and in fastening the chain retaining elements in operative positions on the sides of the tire. With this thought in mind this invention contemplates offsets or loops for holding cross chains on rings with auxiliary loops or ties for retaining the cross chains in the loops and a fastening device in which a pin is withdrawn by a button while an eye on one end of a ring is placed over a hook on the other end and with the parts in position the pin is released to retain the eye on the hook.

The object of this invention, therefore, is to provide rugged and at the same time positive attaching means for split rings of non-skid tire chains and means for retaining the cross chain of the non-skid chains in spaced relation on the rings.

Another object of the invention is to provide improved attaching elements for non-skid tire chains which are readily installed and attached so that they may be applied to the wheels by the average layman.

A further object of the invention is to provide an improved non-skid tire chain which is of a rugged, and at the same time simple and economical construction.

With these and other objects and advantages in view the invention embodies a non-skid device formed with two split rings having spaced loops therein, with cross chains maintained in the loops by auxiliary loops and with eyes on the ends of the rings retained in hooks on the opposite ends of the rings by spring actuated pins.

Other features and advantages of the invention will appear from the following description taken in connection with the drawings wherein:

Figure 1 is a view illustrating the device applied to a tire of a motor vehicle wheel showing the parts in elevation.

Figure 2 is a detail illustrating the clasp for attaching the ends of the rings with the auxiliary loops retaining cross chains in off-set sections of the rings and with parts broken away.

Figure 3 is a plan view of the clasp shown in Figure 2.

Figure 4 is a longitudinal section through the clasp with adjoining parts of the rings shown in elevation.

Figure 5 is a detail showing a cross section through the clasp taken on line 5—5 of Figure 4.

Figure 6 is a detail showing one of the auxiliary loops for retaining the cross chains in the off-set sections of the rings.

Figure 7 is a detail illustrating a modification wherein the cross chains are maintained in the off-set sections of the rings by wires tied across the open ends of the said off-set sections.

Figure 8 is a detail showing a modification wherein the sides of the loop shown in Figure 6 are crimped together.

Referring now to the drawings wherein like reference characters denote corresponding parts the improved non-skid device of this invention includes a pair of split rings 10 with off-set sections 11 therein, with cross chain 12 maintained in the off-set sections by auxiliary loops 13 and with eyes 14 on one of the ends of the rings secured on hooks 5 formed on the other ends of the rings, and wherein the eyes are maintained on the hooks by latches 15, welded or otherwise secured to the ends 16 of the rings.

In the design shown the rings 10 are formed of spring wire or rods and the off-set sections 11 are formed with sloping sides 17 and 18 whereby with the cross chains 12 freely attached to the off-sets by clevises 19 the ends of the chains will remain in the outer portions of the off-sets and with the loops 13 or tie wires 20 extended across the open ends of the off-sets the cross chains will remain in position in the off-sets when the non-skid device is in use and also when it is removed from a tire and placed in a rack, trunk, or the like.

The loops 13 are placed over the off-sets 11 before the clevises 19 are attached thereto, and the wires 20 may be applied to the rings by twisting ends 21 and 22 thereof around the rings as shown in Figure 7.

The sockets 15 are formed of tubes or cylinders with pins 23 slidably mounted therein and the pins are resiliently held outwardly by springs 24 that are positioned in the inner ends of the sockets 25, as shown in Figure 4. The pins are also provided with knobs 26 that extend through slots 27 and the slots are provided with off-set ends 28 having notches 29 on the inner sides thereof in which the knobs 26 are retained with the spring pins 23 drawn into the sockets. The pins 23 coact with hooks 5 on the end 16 of the rings and with the eyes 14 positioned on the hooks they will be retained in position thereon until the pins 23 are manually withdrawn by the knobs 26. By this means the ends of the rings are positively connected and the attaching elements are of rugged construction to withstand the abuse through which tire chains of this type are subjected.

With the sides of the loops 13 crimped together as shown in Figure 8 the cross chains may be turned around the rings to facilitate packing the device for storing. The offsets may, therefore, be formed in any manner or any means may be provided for retaining the cross chains in spaced relation on the rings.

It will be understood that further modifications may be made in the design and arrangement of the parts without departing from the spirit of the invention.

What is claimed is:

In a non-skid tire chain, the combination which comprises a ring adapted to be positioned on one side of a motor vehicle wheel tire, a complementary ring having a split therein adapted to be positioned on the opposite side of said tire and having an eye formed on one end thereof and a hook on the opposite end, said hook positioned to extend through the said eye, the end of the ring on which the hook is positioned having a cylindrical socket rigidly secured on one side thereof, a punger slidably mounted in said socket and positioned to coact with the hook to complete an eye for retaining the first mentioned eye of the opposite end of the ring on the hook, a spring in the socket for urging the plunger outwardly, a button having a shank extended through a slot in the socket for retracting the plunger, said rings having spaced arcuate offsets therein, cross chains connecting the rings and having U-shaped links on the ends for mounting the cross chains in the offsets of the rings, and loops extended across the open sides of the off-sets and crimped into the openings of the offsets for retaining the links on the ends of the cross chains in the said offsets to provide free longitudinal swinging movement of said cross chains and to prevent accidental displacement of said cross chains on said rings.

CHARLES H. REYNOLDS.

REFERENCES CITED

The following references are of record in the file of this patent:

UNITED STATES PATENTS

| Number | Name | Date |
|---|---|---|
| 341,445 | Bristol | May 11, 1886 |
| 710,497 | Myers | Oct. 7, 1902 |
| 1,279,317 | Friberg | Sept. 17, 1918 |
| 1,400,896 | Mestars | Dec. 20, 1921 |
| 1,552,468 | Cole | Sept. 8, 1925 |
| 1,801,159 | Hunter | Apr. 14, 1931 |
| 2,427,973 | Merritt | June 5, 1946 |
| 2,458,642 | Reynolds | Jan. 11, 1949 |
| 2,493,994 | Newman | Jan. 10, 1950 |